(12) United States Patent
Cash

(10) Patent No.: US 9,969,098 B2
(45) Date of Patent: May 15, 2018

(54) CREATING SLOTS IN A DRIP LINE IN REAL TIME IN CONJUNCTION WITH GROUND PLACEMENT OF THE DRIP LINE

(71) Applicant: Trimble Inc., Sunnyvale, CA (US)

(72) Inventor: Michael Cash, Mountain View, CA (US)

(73) Assignee: Trimble Inc., Sunnyvale, CA (US)

( * ) Notice: Subject to any disclaimer, the term of this patent is extended or adjusted under 35 U.S.C. 154(b) by 280 days.

(21) Appl. No.: 14/722,705

(22) Filed: May 27, 2015

(65) Prior Publication Data

US 2016/0349764 A1    Dec. 1, 2016

(51) Int. Cl.
| | |
|---|---|
| *E02B 11/02* | (2006.01) |
| *F16L 1/032* | (2006.01) |
| *B26F 1/24* | (2006.01) |
| *A01G 25/02* | (2006.01) |
| *B26D 5/00* | (2006.01) |
| *B26F 1/18* | (2006.01) |
| *B26D 5/08* | (2006.01) |

(52) U.S. Cl.
CPC ............. *B26F 1/24* (2013.01); *A01G 25/02* (2013.01); *B26D 5/005* (2013.01); *B26D 5/086* (2013.01); *B26F 1/18* (2013.01); *E02B 11/02* (2013.01); *F16L 1/032* (2013.01); *A01G 25/026* (2013.01)

(58) Field of Classification Search
CPC ........ E02B 11/02; E02B 11/005; F16L 1/028; F16L 1/032; F16L 1/038; B26D 3/001
USPC ................. 405/43–45, 156, 180–183; 83/54
See application file for complete search history.

(56) References Cited

U.S. PATENT DOCUMENTS

| 3,684,030 | A | * | 8/1972 | Lucero | E02F 5/102 |
| | | | | | 172/444 |
| 4,003,122 | A | * | 1/1977 | Overmyer | B29C 63/22 |
| | | | | | 29/234 |
| 4,158,534 | A | * | 6/1979 | Hegler | A01G 25/02 |
| | | | | | 425/142 |
| 4,397,585 | A | * | 8/1983 | Fouss | E02F 5/102 |
| | | | | | 405/174 |
| 4,461,598 | A | * | 7/1984 | Flechs | E02F 5/08 |
| | | | | | 111/165 |
| 4,629,363 | A | * | 12/1986 | Rose | E02F 5/101 |
| | | | | | 405/155 |
| 4,650,367 | A | * | 3/1987 | Dietzler | E02B 11/00 |
| | | | | | 138/172 |
| 4,861,195 | A | * | 8/1989 | Hillard | E02F 5/102 |
| | | | | | 37/367 |
| 5,743,675 | A | * | 4/1998 | Fluharty | E02F 5/102 |
| | | | | | 405/180 |
| 5,836,716 | A | * | 11/1998 | Johnson | E02B 11/005 |
| | | | | | 405/43 |

(Continued)

FOREIGN PATENT DOCUMENTS

DE    202013101254    *    8/2013

*Primary Examiner* — Frederick L Lagman
(74) *Attorney, Agent, or Firm* — Kilpatrick Townsend & Stockton LLP

(57) ABSTRACT

An agricultural implement that includes a slotting mechanism and a slotting actuator is provided. The slotting mechanism is for cutting slots in a drip line in real time in conjunction with ground placement of the drip line. The slotting actuator is for actuating the slotting mechanism. The actuating is controlled by a computer following a slot spacing in a drip line prescription for a field in which a drip line is being placed.

11 Claims, 9 Drawing Sheets

(56) References Cited

U.S. PATENT DOCUMENTS

| | | | | |
|---|---|---|---|---|
| 6,073,659 | A * | 6/2000 | Lange | B09C 1/00 |
| | | | | 138/177 |
| 7,337,983 | B1 * | 3/2008 | Boice | A01G 25/02 |
| | | | | 239/1 |
| 8,010,329 | B2 * | 8/2011 | Kallenbach | G06F 17/50 |
| | | | | 137/367 |
| 2002/0172557 | A1 * | 11/2002 | Chen | E02B 11/005 |
| | | | | 405/43 |
| 2005/0028658 | A1 * | 2/2005 | Klimack | B26D 3/001 |
| | | | | 83/54 |
| 2010/0074690 | A1 * | 3/2010 | Jinnings | E02D 5/04 |
| | | | | 405/157 |
| 2010/0327084 | A1 * | 12/2010 | Boice, Jr. | A01G 25/02 |
| | | | | 239/542 |
| 2011/0219925 | A1 * | 9/2011 | Singh | B26F 1/0038 |
| | | | | 83/53 |
| 2012/0069706 | A1 * | 3/2012 | Goujon | G01V 1/201 |
| | | | | 367/37 |
| 2012/0217005 | A1 * | 8/2012 | Gupta | B23D 45/122 |
| | | | | 166/227 |
| 2013/0251458 | A1 * | 9/2013 | Meunier | G01V 1/166 |
| | | | | 405/180 |
| 2014/0079487 | A1 * | 3/2014 | Sjodahl | E02F 3/188 |
| | | | | 405/180 |

* cited by examiner

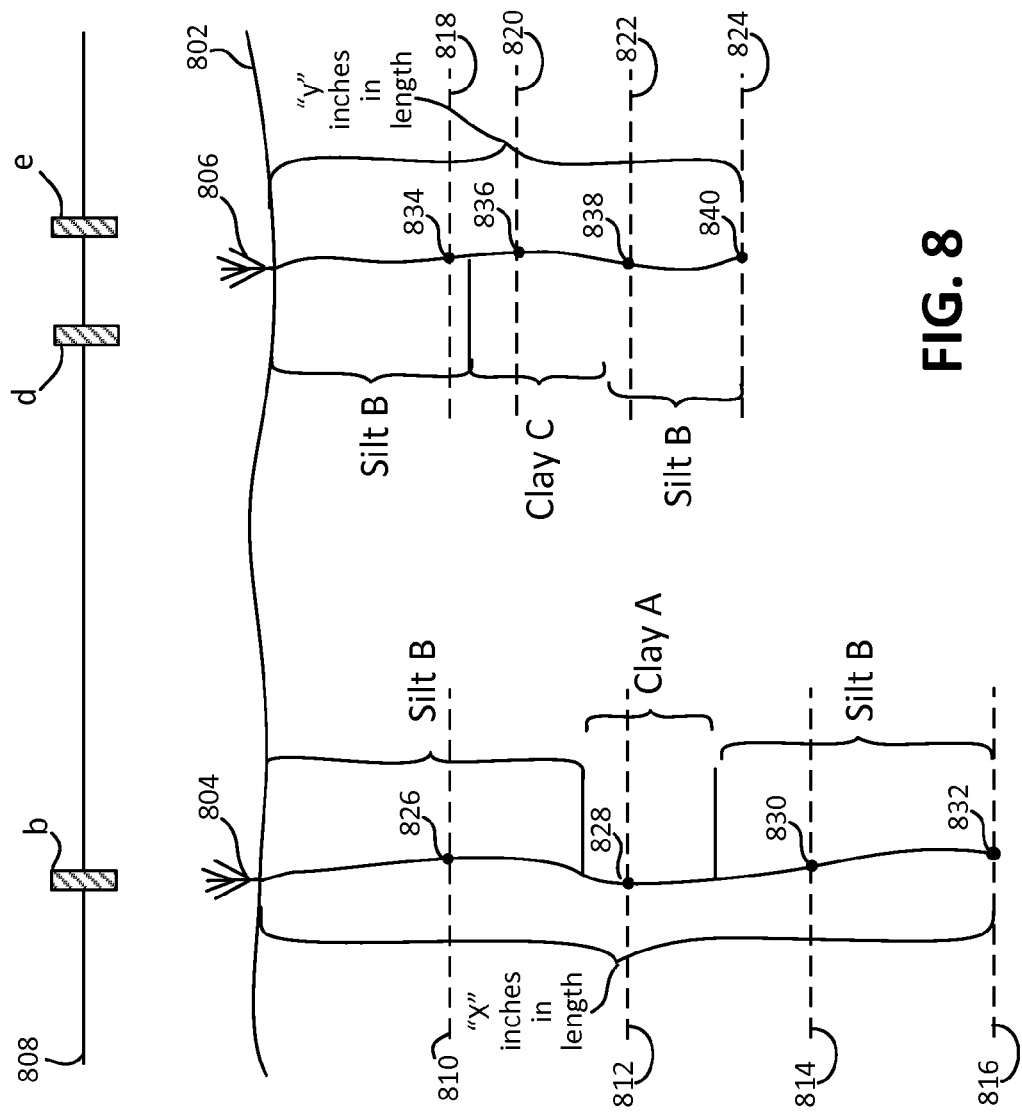

CREATING SLOTS IN A DRIP LINE IN REAL TIME IN CONJUNCTION WITH GROUND PLACEMENT OF THE DRIP LINE

BACKGROUND

Agricultural irrigation systems are used to water plants in a field. There are many different types of irrigation systems. One type is a center pivot irrigation system with several segments of pipe that have sprinklers and are connected together. The connected segments are mounted on wheels and connected to a water source at one end. The connected segments move around the water source in a circular manner. However, because center pivot irrigation systems are very high, they cannot be used in certain types of fields, such as orchards or fields with power lines.

Another type of agricultural irrigation system is drip irrigation where drip lines are placed on the surface of the ground, on posts, or under the ground's surface. The drip lines are connected to a water source and the water comes out of slots in the drip lines. Drip irrigation is well suited for vineyards, orchards and fields with power lines. Drip irrigation can also be used in fields where center pivot irrigation can be used.

The typical tradeoff between a pivot irrigation system and a drip irrigation system is the installation and maintenance cost compared to the increased efficiency of the drip irrigation system. For example, installation and maintenance of a drip irrigation system may cost 50 percent more than for a pivot irrigation system. However, as water becomes more scarce, harder to obtain and costlier, interest in a high efficiency solution provided by drip irrigation will become more attractive.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

FIG. 8 illustrates a drip line laid over the ground's surface, demonstrating root profiles of the plant and a growth state of the plant, in accordance with an embodiment.

DESCRIPTION OF EMBODIMENTS

Notation and Nomenclature

Figure 1:
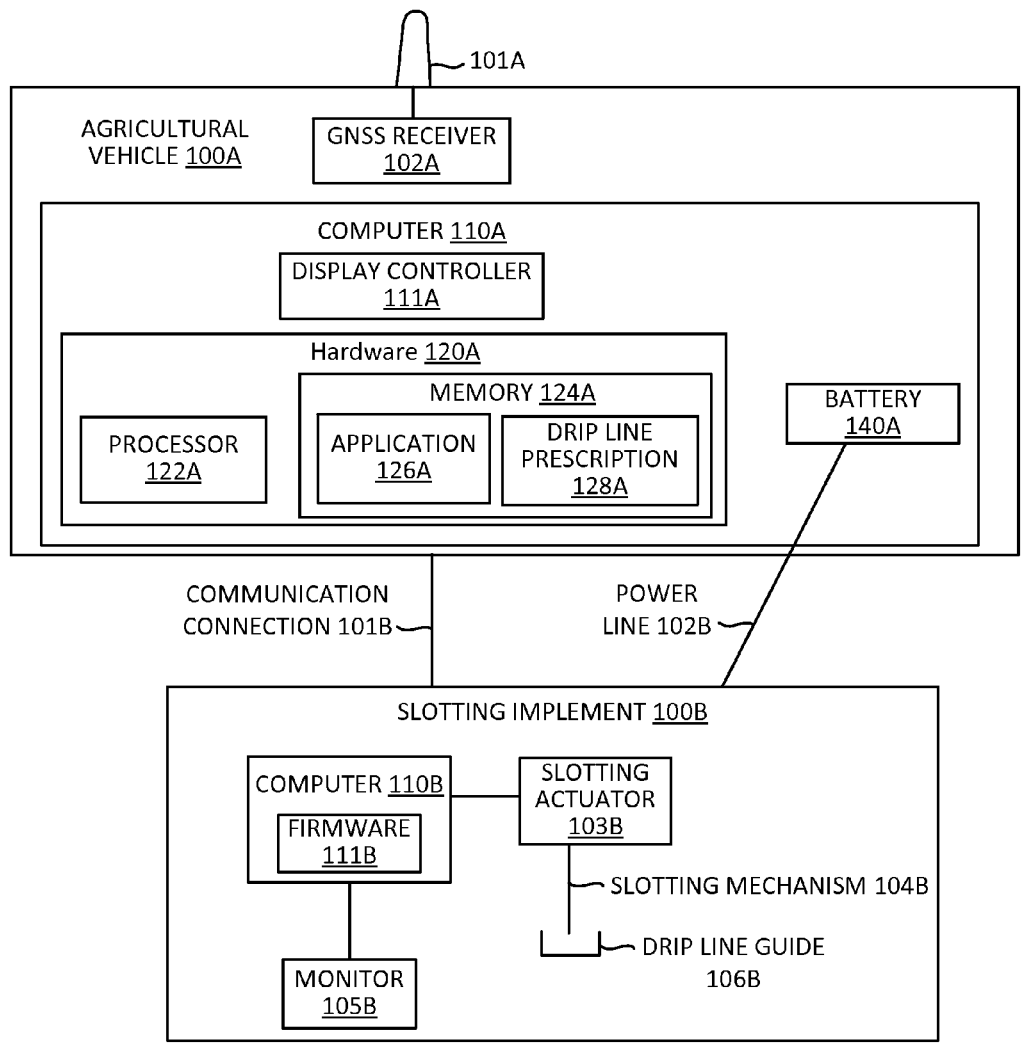
FIG. 1 depicts a block diagram of an agricultural drip line slotting implement coupled with an agricultural vehicle, according to one embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "cutting," "creating," "actuating," "controlling," "receiving," "transmitting," "burying," "placing," "opening," "holding," "guiding," "interpreting," "adjusting," "determining," "calculating," "performing," "repeating," "varying," "unspooling," "transforming data," "modifying data to transform the state of a computer system," or the like, refer to the actions and processes of a computer system, data storage system, storage system controller, microcontroller, hardware processor, such as a central processing unit (CPU), or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview of Discussion

Conventionally, slots are created in drip lines at a manufacturing facility and then the drip lines are shipped to a purchaser for subsequent placement into an agricultural field. A drip line may be a tape type drip line (also referred to as "drip tape") or a tube type drip line (also referred to as "drip tube"). A drip tape is flatter than a drip tube and can be inflated, for example, when water or air enters the drip tape. A drip tape can be folded.

Various embodiments provide for processing an unslotted drip line in real time as the drip line is being placed into an agricultural field. Various embodiments provide for an agricultural drip line slotting implement that is used in real time to create slots in an unslotted drip line as it is being placed into the agricultural field. Various embodiments provide for an agricultural drip line slotting implement that is used in real time to create additional slots in a previously slotted drip line as it is being placed into the agricultural field. For example, a farmer could purchase a drip line that was slotted at a manufacturer and use an agricultural drip line slotting implement to create additional slots in it.

According to one embodiment, the slots are all the same size and are equal distances apart. According to another embodiment, the drip line that is processed in real time using a slotting implement provides for variable rate irrigation. For example, the slots may not all be the same distance apart. In another example, the slots may not all be the same size. In yet another example, both the distance between the slots and the size of the slots may vary. Therefore, a variable rate drip line can provide more water in certain areas of a field and less water in other areas of a field. According to one embodiment, a drip line prescription is used to determine the distance between the slots and the size of the slots, as will become more evident. The distances between the slots or the size of the slots or a combination thereof is known as "slot spacing."

Conventional drip line installation implements have been used to place drip lines with slots that were created at a manufacturing facility. Various embodiments provide for the agricultural drip line slotting implement to be an add-on-kit that is coupled with a conventional drip line installation implement. For example, a farmer may purchase a conventional drip line installation implement at one point in time and then later buy the add-on-kit that can be coupled with the conventional drip line installation implement.

Illustrations of Agricultural Implements

FIG. 1 depicts a block diagram of an agricultural drip line slotting implement 100B coupled with an agricultural vehicle 100A, according to one embodiment.

FIG. 1 depicts one or more antenna 101A, a first computer 110A, a power source, a slotting actuator 103B, a slotting mechanism 104B, a drip line guide 106B, a second computer 110B, a drip line monitor 105B, a communication connection 101B, and a power line 102B. The first computer 110A includes a display controller 111A and hardware 120A. The hardware 120A includes a processor 122A and memory 124A. The memory 124A includes a real time drip line slotting application 126A and a drip line prescription 128A. The memory 124A may also include information for automatic guidance of the agricultural vehicle 100A, such as guidance lines, information pertaining to where the vehicle 100A has been, path planning information to control where the vehicle 100A will go, information about what the vehicle 100A has been done, information pertaining to what one or more implements attached to the vehicle 100A have done, information about the type of implement(s) that are attached to the vehicle 100A, information that was communicated to this vehicle 100A from other vehicle 100As in the field, and information pertaining to the amount of drip line that remains on one or more spools.

The one or more antenna 101A may be located on an agricultural vehicle 100A. For example, at least one antenna 101A may be located on top of the agricultural vehicle 100A's cab. Additional antenna 101A may be located other places on the vehicle 100A.

The first computer 110A may be located on the dash board in the vehicle 100A's cab. The first computer 110A can be a smart device. The agricultural drip line slotting implement 100B, according to one embodiment, includes one or more of the slotting actuator 103B, the slotting mechanism 104B, the drip line guide 106B, the second computer 110B, the drip line monitor 105B, the communication connector and the power line 102B. The agricultural drip line slotting implement 100B may also include the first computer 110A.

As depicted in FIG. 1, the antenna 101A is connected with the GNSS (Global Navigation Satellite System) receiver 102A and the GNSS receiver 102A is connected with the first computer 110A. The first computer 110A is connected with the second computer 110B. The second computer 110B is connected with the slotting actuator 103B and the drip line monitor 105B. The second computer 110B and the slotting actuator 103B are connected with at least one power source. Various embodiments are well suited for connecting the various features in other ways.

The display controller 111A, according to one embodiment, is a device driver for a visual display of the first computer 110A, according to one embodiment. Various types of information, such as all or a subset of the information stored in the hardware memory 124A as well as other information, can be displayed and updated on the visual display.

The application 126A includes instructions for one or more operations that include receiving and possibly storing GNSS positions from the GNSS receiver 102A, translating the GNSS positions into slot mechanism positions, as discussed herein, receiving a drip line prescription 128A, storing the drip line prescription 128A in hardware memory 124A, interpreting the drip line prescription 128A, and determining whether to transmit an actuation command to the second computer 110B, as discussed herein, according to various embodiments. The application 126A can cause various types of information, such as all or part of the information stored in hardware memory 124A, to be displayed and updated on a display of the first computer 110A for the operator of the agricultural vehicle 100A. The hardware processor 122A executes the instructions of the application 126A.

An example of the power source is the battery 140A of the agricultural vehicle 100A. However, embodiments are well suited for other power sources and other types of power sources. Further, the power source may be in other locations. For example, the power source may be a battery 140A dedicated to the agricultural drip line slotting implement 100B. Another example of a power source is the hydraulic system of an agricultural vehicle 100a. The hydraulic motor can be used to turn a shift or drive a piston to create the slots in a drip line. Electronic communication could still be used.

Examples of a communication connection 101B are a controller area network (CAN) bus, a serial line, serial cable, bus line, and wireless communication.

The second computer 110B receives actuation commands from the first computer 110A, as discussed herein. The second computer 110B can include instructions to perform one or more of receiving the actuation command and controlling the actuation of the slotting mechanism 104B and the de-actuation of the slotting mechanism 104B. According to one embodiment, the slotting mechanism 104B may automatically be de-actuated without a de-actuation control from the slotting actuator 103B. According to one embodiment, the actuation command that is transmitted from the first computer 110A to the second computer 110B in combination with the actuation signal from the second computer 110B to the slotting actuator 103B are referred to as a "command."

According to one embodiment, an input to the second computer 110B is measurements from the drip line monitor 105B of how much drip line has spooled and outputs are controls to the slotting mechanism 104B. The second computer 110B can send the measurements to the first computer 110A. Alternatively the measurements can be received by the first computer 110A. For example, the first computer 110A can approximate the amount of drip line that has been laid based on the distance that the vehicle 100A has traveled. The first computer 110A can display various status messages pertaining to the amount of drip line that is left on the spool. According to one embodiment, the second computer 110B is a real time system that may include firmware 111B. The firmware 111B can include the instructions of the second computer 110B, as described herein. Alternatively, the instructions may be implemented as software instructions that are executed by a hardware processor of the second computer 110B.

Examples of a slotting mechanism 104B are a knife and a needle. A slotting mechanism 104B can be any mechanism that can create a slot. Examples of a slot are a rounded hole and a slit. However, a slot could have other shapes. The creating of slots in a drip line is also called "processing the drip line" or "perforating the drip line."

Examples of a slotting actuator 103B are a solenoid and motorized wheel. The slotting mechanism 104B may be electromechanical, electromagnetic, or hydraulic. The slotting actuator 103B actuates the slotting mechanism 104B in response to the actuation command. For example, the slotting mechanism 104B can cause the slotting mechanism 104B to lower, thus, puncturing a slot into a drip line positioned below it in response to being actuated and then raise the slotting mechanism 104B to remove the slotting mechanism 104B from the drip line. The slot may be created in one side of the drip line or may pass through both sides of the drip line so long as the size of the slot would enable the amount of water specified by the drip line prescription 128A, as described herein, for that slot to exit the drip line.

Examples of a drip line monitor 105B are an encoder or an optical measurement mechanism. The use of a drip line monitor 105B is optional. The distance that the agricultural vehicle 100A has traveled can be used as an estimate of the length of drip line that has been processed by the agricultural drip line slotting implement 100B. The drip line monitor 105B determines how much of the drip line has been perforated with slots. This determination or calculation can be used to determine the amount of drip line that has yet to be perforated with slots.

Examples of a drip line guide 106B are a u shaped bracket, an L shaped bracket, and a square tube. These are just a few examples as various embodiments are well suited to other types and shapes of drip line guides 106B. The drip line can move through or besides the drip line guide 106B while positioning the drip line with respect to the slotting mechanism 104B. The use of a drip line guide 106B is optional.

FIG. 1 depicts a block diagram of an agricultural drip line slotting implement with one slotting mechanism, according to one embodiment. However, various embodiments are well suited to agricultural drip line slotting implements with a plurality of slotting mechanisms where one of the slotting mechanisms is associated with each spool. For example, FIG. 2 depicts a block diagram of an agricultural drip line slotting implement with a plurality of slotting mechanisms coupled with an agricultural vehicle, according to another embodiment.

Figure 2:
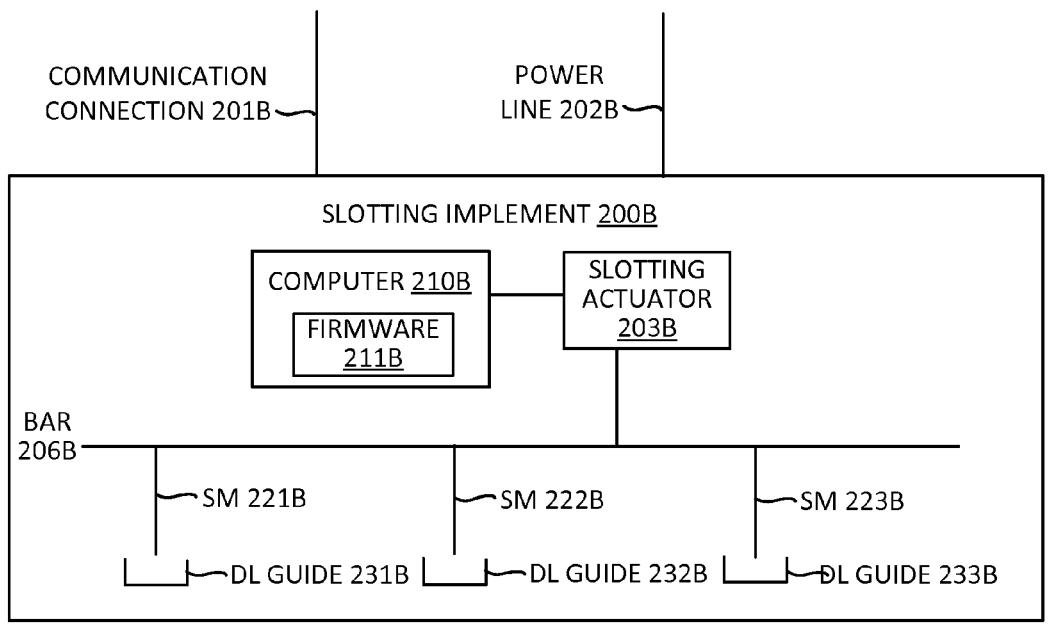
FIG. 2 depicts a block diagram of an agricultural drip line slotting implement with a plurality of slotting mechanisms coupled with an agricultural vehicle, according to another embodiment.

As depicted in FIG. 2, the agricultural drip line slotting implement 200B includes a slotting actuator 203B, a second computer 210B, a bar 206B, slotting mechanisms 221B, 222B, 223B, and drip line guides 231B, 232B, 233B. The computer 210B and the slotting actuator 203B are coupled with each other. The slotting actuator 203B is coupled with a slotting-actuator-to-slotting-mechanism-coupling-mechanism, such as a bar 206B. The bar 206B may be what is known as a "tool bar." FIG. 2 depicts three slotting mechanisms 221B, 222B, 223B attached to the bar 206B. Various embodiments are well suited to a different number of slotting mechanisms being attached to the bar 206B. As depicted in FIG. 2, there are drip line guides 231B, 232B, 233B associated with each of the slotting mechanisms 231B-233B. There may be a drip line monitor associated with each of the slotting mechanisms. Various embodiments are well suited for a different number of drip line monitors. For example, as discussed herein, drip line monitors are optional. More specifically, the distance that the agricultural vehicle 100A (FIG. 1) has traveled can be used as an estimate of the length of the portion of drip line that has been processed by the agricultural drip line slotting implement 100B, 200B. In another example, there may be one drip line monitor associated with one of the slotting mechanisms 221B-223B and it can be assumed that the same amount of tape line was used for the un-monitored tape lines. Further, the use of drip line guides is optional.

Further still, there may be more than one power source. For example, one power source may be used for the second computer 110B, 210B, another power source for the slotting actuator 103B, 203B, and another for one or more drip line monitors.

In another embodiment, there may be a slotting actuator associated with each slotting mechanism. According to one embodiment, all of the slotting actuators may be communicatively coupled with the computer 210B and receive signals from the computer 210B in response to the computer 210B receiving an actuation command from computer 110A.

Various embodiments also provide for a plurality of slotting mechanisms associated with each spool. For example, one slotting mechanism associated with a spool could create a 5 gallon per hour slot and another slotting mechanism associated with the same spool could create a 10 gallon per hour slot. Similarly a pair that includes 5 gallon per hour slotting mechanism and a 10 gallon per hour slotting mechanism may be associated with a first spool and another pair that includes a 5 gallon per hour slotting mechanism and a 10 gallon per hour slotting mechanism may be associated with a second spool and so on with other spools if they are used.

According to one embodiment, the slotting implement is an add-on-kit. Therefore, the kit may include coupling mechanisms, such as brackets, for mounting the slotting implement to an installation implement.

Figure 3A:
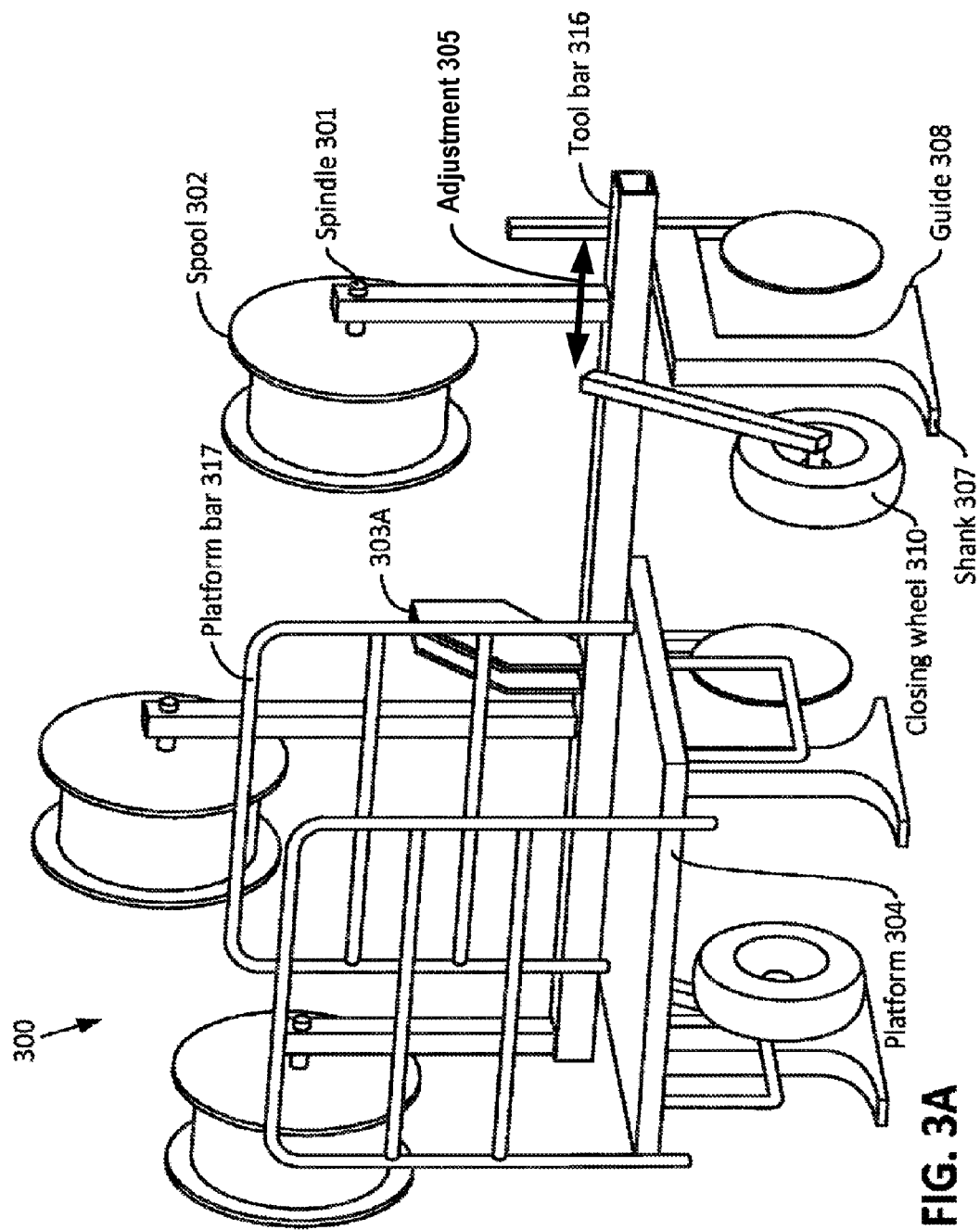
FIG. 3A depicts a drip line installation implement, according to one embodiment.

FIG. 3A depicts a drip line installation implement 300, according to one embodiment.

The drip line installation implement 300 may include a hitching mechanism 303A, tool bar 316, platform 304, platform bar 317, one or more spindles 301 for holding respective drip line spools 302, a brake, shank 307, a guide 308 that is inside the shank or attached to the outside of the shank, and a closing wheel 310. A drip line installation implement may not include all of these features. For example, a drip line installation implement may not include at least one or more of a platform 304, brake, a shank 307 or a closing wheel 310.

According to one embodiment, a hitching mechanism 303A couples with a draw bar and a hitch. Examples of a hitch are a one point or a three point hitch. The hitching mechanism 303A can be used to connect the drip line installation implement with the agricultural vehicle. The installation mechanism 300 can include one or more spindles 301 for each holding a spool 302. The brake can be used to prevent the drip line from spinning as it is being unspooled from the spool. The platform 304 can provide a place for carrying extra drip line spools 302 or for a person to stand on. The shank 307 can be used to create an opening in the ground to place the slotted drip line into. The guide 308 can be used to position the drip line for placement into the ground. For example, the guide 308 can prevent the drip line from becoming tangled or being accidentally cut by the shank 307. The closing wheel 310 can move and possibly pack dirt back into the opening of the ground. Typically the dirt will fall back into the opening without the use of a closing wheel.

The tool bar 316, according to one embodiment, facilitates adjusting the position of the spindles 301 and their respective spools 302. For example, the position of the spindles 301 may be adjusted 305 so that they are further apart or closer together. More specifically, different row widths are typically used for different types of crops. Further, for some types of crops, a drip line may be placed every other row instead of every row because the roots of crops in two adjacent rows will grow towards each other. In one example, 30 to 36 inches is a common row width for corn and since the drip line is placed every other row for corn, the drip line may be placed every 60 or 70 inches. Other widths may be used for other types of crops.

The installation implement 300 may include shank adjustment controls for adjusting how deeply a shank 307 cuts the opening in the ground, and, therefore, can adjust how deeply a drip line is buried into the ground.

Figure 3B:
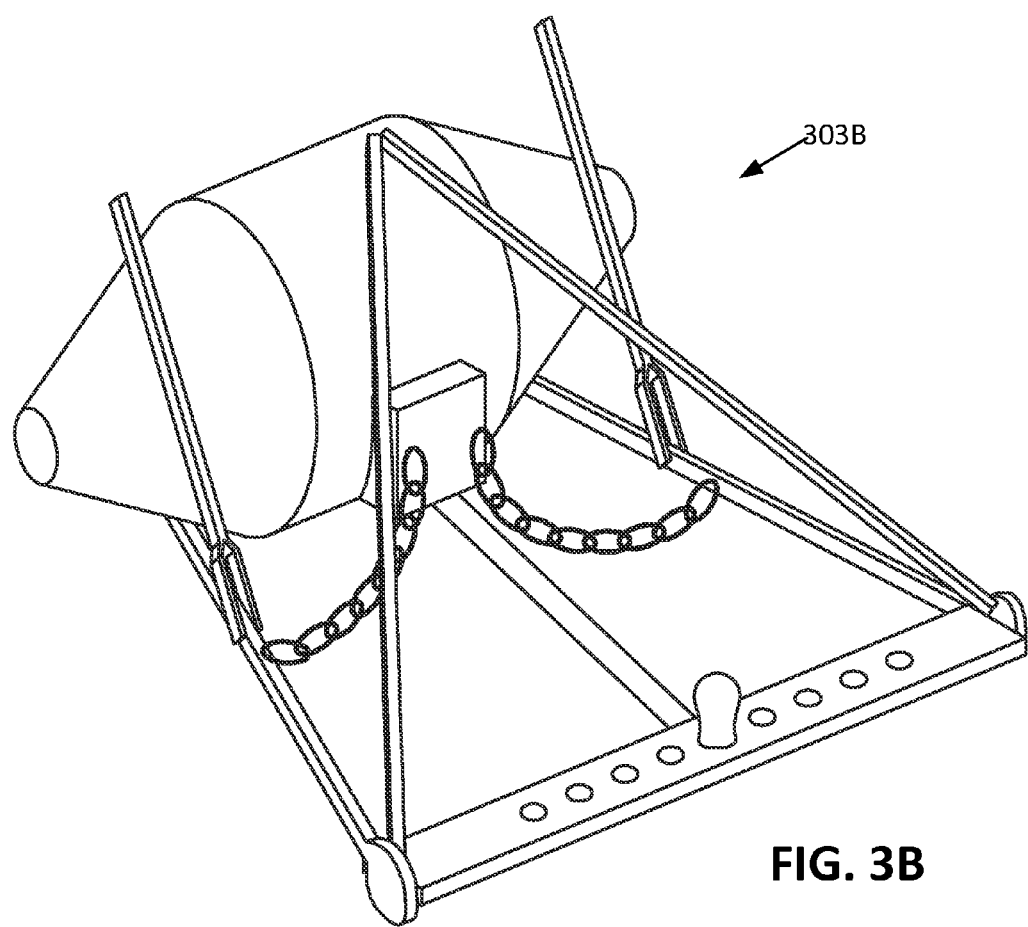
FIG. 3B depicts a hitch 303B that is a three point hitch, according to one embodiment.

FIG. 3B depicts a hitch 303B that is a three point hitch, according to one embodiment. For example, the hitch 303B can be connected with the hitching mechanism 303A.

Figure 4:
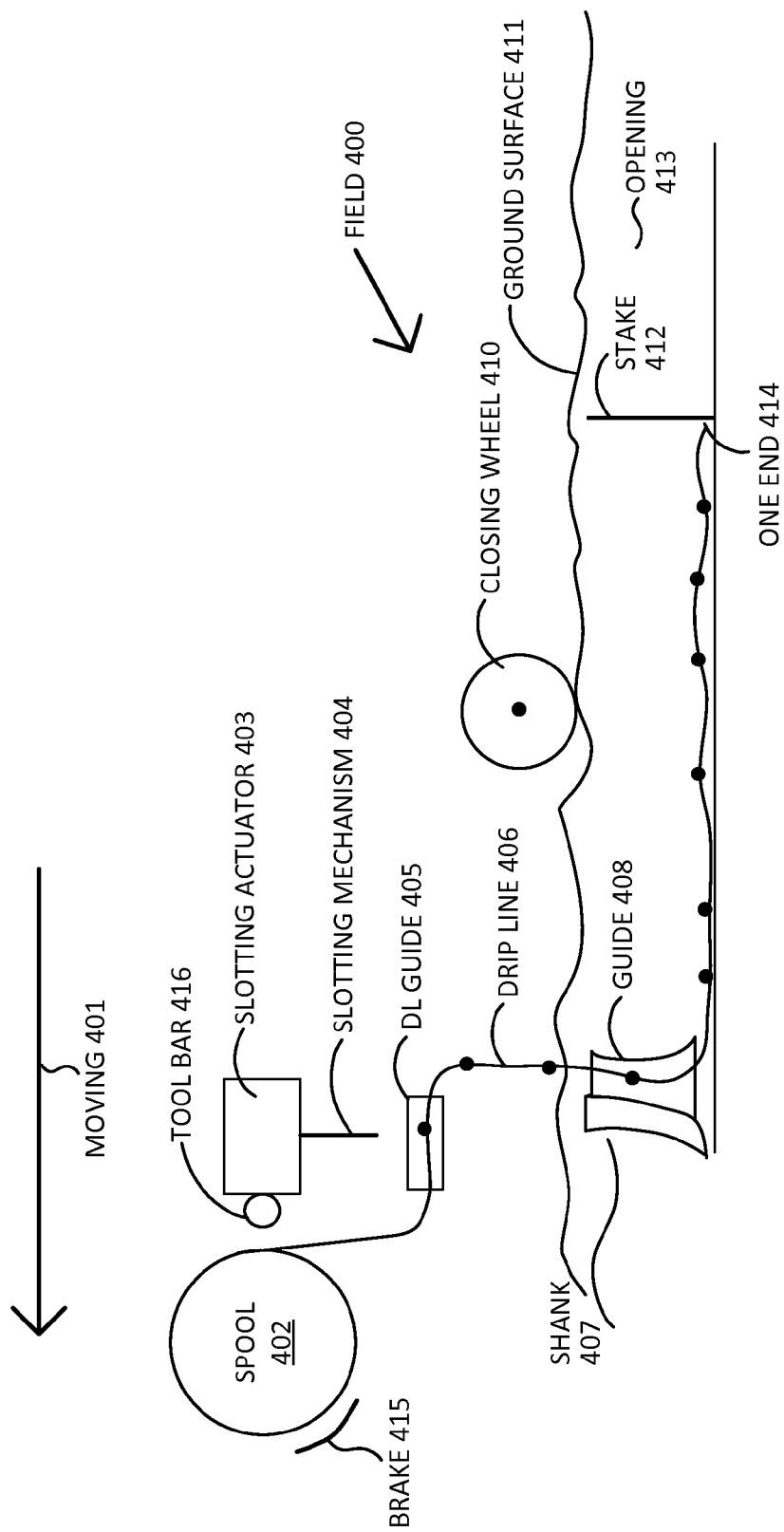
FIG. 4 depicts use of an agricultural drip line slotting implement that is coupled with a drip line installation implement in a field, according to one embodiment.

FIG. 4 depicts use of an agricultural drip line slotting implement 100B, 200B that is coupled with a drip line installation implement in a field 400, according to one embodiment.

FIG. 4 depicts a drip line 406 that includes a slotted portion and an unslotted portion. The slotted portion has already been processed by the slotting mechanism 404 and the unslotted portion has yet to be processed by the slotting mechanism 404.

According to one embodiment, one end 414 of the drip line 406 can be attached to a stake 412 in the ground. FIG. 4 depicts the surface 411 of the ground and an opening 413 in the ground. As the agricultural vehicle 100A moves 401, the drip line 406 will unspool from the spool 402 due to tension of the drip line 406's one end 414 being attached to the stake 412 and the vehicle 100A pulling the other end. A brake 415 can be used to prevent the drip line 406 from spinning as it is being unspooled from the spool 402. Further, the shank 407 will create an opening 413 in the ground. As the drip line 406 unspools, the drip line 406 will pass through drip line guide 405 to properly position the drip line 406 with respect to the slotting mechanism 404. The drip line guide 405 may be part of the drip line installation implement or the slotting implement. If the installation implement already includes the drip line guide 405, then the slotting implement can use it instead of providing one itself. The slotting mechanism 404 creates slots, as represented by the dots, in the drip line 406 in response to the slotting mechanism 404 being actuated by the slotting actuator 403. The slotting actuator 403 is attached to a tool bar 416. The slotted drip line can then pass through the shank 407, beside, or behind the shank 407. As depicted in FIG. 4, the slotted portion of the drip line 406 passes behind the shank 407 using a guide 408 that is attached to the back of the shank 407. Various embodiments are well suited to a guide that is internal to the shank 407 instead of attached to the side of the shank 407. As the slotted portion of the drip line 406 exits the bottom of the guide 408, the drip line 406 is placed at the bottom of the opening 413. According to one embodiment, a closing wheel 410 can be used to move dirt back into the opening 413. However, various embodiments are well suited to not using a closing wheel. For example, dirt will typically fall back into the opening 413 without the use of a closing wheel.

Embodiments are well suited for placing the agricultural drip line slotting implement 100B, 200B in other locations. For example, the slotting implement 100B, 200B can be placed anywhere between the spool 402 and the bottom of the shank 407. In an example, the slotting implement 100B, 200B may be coupled to the shank 407 and the guide 408 may be used for positioning the drip line 406 with respect to the slotting mechanism 404.

According to various embodiments, a drip line placement system includes one or more features of a drip line slotting implement 100B, 200B and a drip line installation implement 300. The drip line placement system may include features of an agricultural vehicle 100A.

Various embodiments provide a drip line placement system comprising: a computer 110A for interpreting a drip line prescription 128A for a field in which a drip line 406 is being placed; a GNSS receiver 102A coupled with the computer 110A and configured for determining or calculating a position of the drip line placement system; and an agricultural implement 100B, 200B communicatively coupled with the computer 110A, the agricultural implement comprising: a slotting mechanism 404 for cutting slots in a drip line 406 in real time in conjunction with ground placement of the drip line 406; and a slotting actuator 403 for actuating the slotting mechanism 404, wherein actuation of the slotting actuator 403 is controlled by the computer 110A, 110B following a slot spacing prescribed for the position in the prescription 128A.

Various embodiments provide a drip line placement system further comprising a shank 407 for creating an opening 413 in the ground of the field 400 for burying the drip line 406 after the slots are cut by the electrically controlled slotting mechanism 404.

Various embodiments provide a drip line placement system further comprising one or more spindles for holding one or more spools of drip line, for example spindles 302 for holding spools 402 of drip line 406. According to one embodiment, a spool can have a hole in the center that is placed on the spindle to hold the spool in place.

Various embodiments provide a drip line placement system further comprising a tool bar 206B for adjusting placement of two or more spindles for each holding respective spools of drip line, for example spools 402 of drip line 406.

Figure 5A:
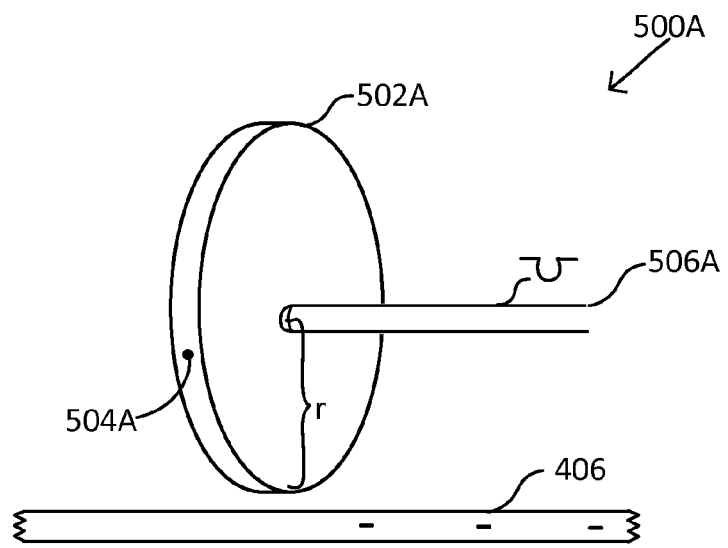
FIGS. 5A and 5B depict slotting apparatuses, according to various embodiments.
Figure 5B:
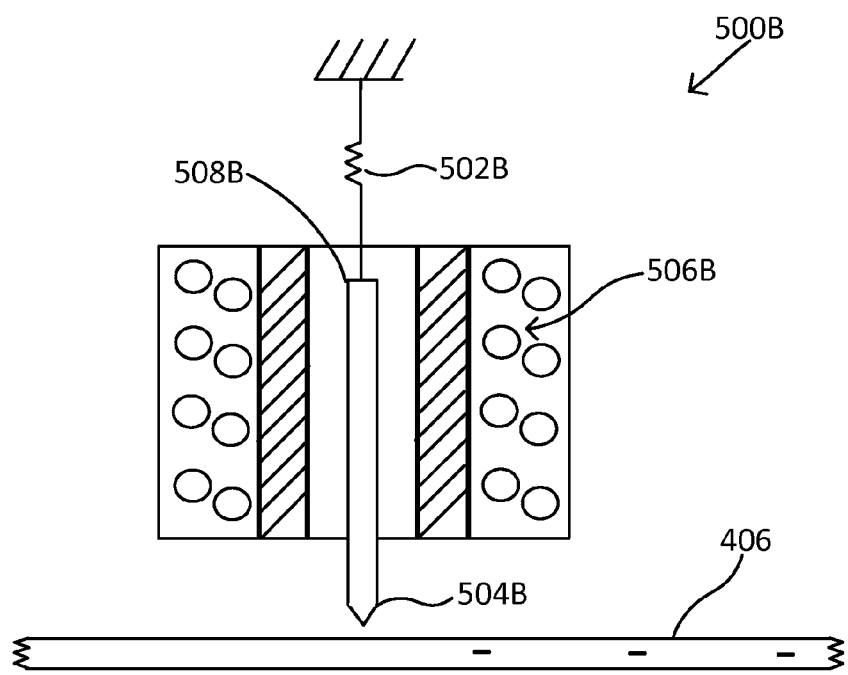

FIGS. 5A and 5B depict slotting apparatuses, according to various embodiments.

The slotting apparatus 500A depicted in FIG. 5A includes a wheel 502A, a slotting point 504A, such as knife or needle, and a rod 506A. The rod 506A can be attached to a slotting actuator that turns the rod 506A at a specified speed causing the slots to be created in the appropriate locations on the drip line. The slotting point 504A is attached or part of the edge of the wheel 502A and creates a slot in the drip line 406 each time the slotting point 504A comes into contact with the drip line 406 as the wheel 502A turns. Omega $\Omega$ represents the angular velocity of the rod 506A and R represents the radius of the wheel 502A. The spacing of the slots in the drip line 406 can be changed by increasing or decreasing the speed that the wheel 502A rotates, as described herein. According to one embodiment, the wheel 502A rotates at the same speed as the drip line 406 when $\Omega \times R = V_{tape}$, where $V_{tape}$ is the speed that the drip line 406 is moving. Further, the rotation of the wheel 502A is different (also referred to as "slip") than the speed the drip line 406 moves when $\mho \times R \neq V\text{tape}$.

The slotting apparatus 500B depicted in FIG. 5B includes a solenoid. The slotting apparatus 500B includes a spring return 502B, a plunger 508B, an electromagnetic coil 506B, and a slotting mechanism 504B that is a slotting point. The plunger 508B can be actuated causing it to be pushed downward creating a slot in the drip line 406.

Drip Line Prescription Overview

According to one embodiment, a drip line prescription is used to determine the distance between the slots or the size of the slots or a combination thereof. The drip line prescription can be a uniform drip line prescription or a variable rate drip line prescription.

According to one embodiment, a uniform drip line prescription specifies creating slots in a drip line that are all the same size and the same distance apart. Uniform drip line prescriptions are well known in the art and various types of well-known information can be used to create a uniform drip line prescription. Examples of well-known information include a single soil type for a large geographical region that encompasses the field, the density of the plants in the field, and weather exposure.

An example of a large geographical region is region 8 that includes the Santa Rosa Plain and Sonoma Valley in California. A published study by the University of California called the Water Use Classification of Landscape Species ("WUCOLS") specifies the percentage of the "percentage of evapotranspiration$^0$ (ET$^0$)" (the species or crop "factor") needed by all normally available landscape plants. The estimated quantity of water that is needed each month for any given plant type in a specified region may be calculated using conventionally available zone maps that specify the regions and the Water Use Classification of Landscape Species ("WUCOLS").

Examples of crop factors (also known as "crop coefficients") associated with crop species include very low (0.1 crop coefficient and <10% of ET$^0$), low (0.1-0.3 crop coefficient and 10%-30% of ET$^0$), moderate (0.4-0.6 crop coefficient and 40%-60% of ET$^0$), and high (0.7-0.9 crop coefficient and 70%-90% ET$^0$). Examples of plant density are low-sparse coverage (0.5-0.9 planting density factor), average-moderate coverage (1.0 planting density factor), and high-complete coverage (1.1-1.3 planting density factor). Examples of weather exposure are a protected shady location (exposure factor 0.5-0.9), an open field with low to moderate wind and part sun (exposure factor 1.0), and higher winds and greater exposure (exposure factor 1.1-1.4).

The following well known equation 1 can be used for determining an estimated amount of water required for plants in a given month for a particular type of plant for a particular region is as follows:

([ET$^0$ for region and month×crop coefficient×planting density factor×exposure factor×planted area in square feet/drip irrigation efficiency factor [90%])×conversion factor [0.623]   EQUATION 1

According to another embodiment, a variable rate drip line prescription specifies creating slots in the drip line where the distance between the spaces are not all the same or the size of the slots are not all the same or both. For example, soil mapping technology involving vertical transections of the soil within the field to be drip irrigated can be used. More specifically, the soil conditions data can include data relating to the soil type and the soil's physical (e.g., continuous soil vertical profile [in some embodiments, near-continuous soil vertical profile], including the depth and thickness of soil layers) and chemical properties. The delineation of such soil conditions data into a two and/or three dimensional form is provided. Thus, various embodiments make use of soil mapping technique that provides soil information for vertical transects of soil at a planting location, in order to determine the percolation rate of water through this vertical transect of soil. Flowing from the determination as to the percolation rate of water through the vertical transect, how much water the vertical transects of soil can hold (a.k.a., "total water content" in the vertical transects of the soil) and the desired plant available water content that is accessible from the vertical transect of soil and by the plant can be determined.

Variable rate drip line prescription embodiments can use one or more of the following types of information to determine spacing and/or slot size (as per water flow capabilities). 1) (near-continuous) vertical transect soil information; 2) information about the plants' demand for water over varying periods of time; 3) climate conditions data relating to the plant's location; 4) the geographical conditions data (e.g., exposure to the elements, planted on slope) relating to the plants' locations; 5) terrain, and 6) distance of slots from the water source. The terrain information can include elevation information. The elevation information can be used for compensating for pressure variation with the spacing of slots. Pressure drops due to "flow losses" or "friction losses" in the plumbing as the distance between the slots and the water source increases. Thus, various embodiments enable a drip line to be designed that more efficiently waters plants, influences and encourages healthy plant growth, and saves a grower's resources (e.g., one or more of water, money, time, fertilizer, and energy), using a variable rate drip line prescription.

A variable rate drip line prescription provides for determining the type of soil existing in a field to be irrigated by using soil conditions information that includes vertical transects data relating to at least one vertical transact taken within the field. The vertical transect may have multiple layers of different types of soil. Various embodiments consider multi-layered soil conditions when determining the flow rate of water to be supplied to the soil via a drip line. The Soil Information System™ (SIS) provided by C3, a division of Trimble®, headquarted in Sunnyvale, Calif., provides a three dimensional database of field soil, obtaining over sixty physical and chemical characteristics.

A uniform drip line prescription may specify a plurality of positions in the field that are all the same distance apart. For example, the uniform drip line prescription may specify positions a, b, c and d where there is the same distance between a, b, c, and d. In another example, the uniform drip line prescription may specify a position, a number of slots and the distance that each of the slots should be separated.

A variable drip line prescription may specify a plurality of positions in a field where the distance between two adjacent positions is not the same as the distance between two other adjacent positions. For example, the variable drip line prescription may specify positions a, b, c and d where there is 10 inches between a and b, 10 inches between b and c but there is 18 inches between c and d. In another example, a variable drip line prescription may specify at least two positions, where a number of slots and a distance between those slots is associated with each of the two positions. The distances associated with the at least two positions would not be the same. For example, the variable drip line prescription may specify positions a and b where 10 slots that are 18 inches apart are to be created starting at position a and 3 slots that are 12 inches apart are to be created starting at position b.

A drip line prescription can also specify the amount of water that each of the slots should allow to exit the drip line. For example, it may specify that a slot is a 5 gallon per hour slot. This is just one example. Various embodiments provide for creating a slot with the correct size to allow 5 gallons per hour of water to exit the drip line in response to the drip line prescription specifying a 5 gallon per hour slot.

A variable rate drip line prescription can vary either the distance between slots or the size of the slots or vary both. For example, a variable rate drip line prescription could specify 5 gallon per hour slots where some are spaced at 18 inches and others spaced at 10 inches. In another example, the variable rate drip line prescription may specify a 3 gallon per hour slot and a 2 gallon per hour slot that are 5 inches apart and the 2 gallon per hour slot is 5 inches apart from another 3 gallon per hour slot. In yet another example, the 3 gallon per hour slot and the 2 gallon per hour slot may be 7 inches apart and the 2 gallon per hour slot and another 3 gallon per hour slot may be 10 inches apart.

Positions and Coordinate Systems

According to one embodiment, a GNSS receiver that is coupled to an antenna of an agricultural vehicle receives GNSS positions. Positions of a slotting mechanism (also referred to as a "slotting mechanism positions") can be determined based on one or more of the GNSS positions and a model of the agricultural vehicle coupled with an agricultural implement that includes the slotting mechanism. For example, typically a GNSS position is a three dimensional position x, y, z in the three dimensional GNSS coordinate system. The model, according to one embodiment, can describe a three dimensional physical relationship between the antenna where a GNSS position would be received and the shank. More specifically, the model could specify three distances (also referred to as "offsets," "geometric distances," or "geometric offsets") with respect to an x axis, a y axis and a z axis representing the three physical dimensions between the antenna and the tip of the shank 407 where the drip line 406 will exit.

Various methods can be used for calculating slotting mechanism positions. For example, a time advance of how much time it would take the drip line to travel from the slotting mechanism 404 to the tip of the shank 407 can be used to calculate slotting mechanism positions. In another example, three dimensional distances or offsets from the tip of the shank 407 to the slotting mechanism 404 could be used to calculate the slotting mechanism positions. In yet another example, the slotting mechanism positions can be calculated based on the three dimensional distances between the antenna and the slotting mechanism and the respective x, y, z coordinates of the received GNSS position of the antenna to determine the slotting mechanism position of the slotting mechanism. The advance time or the three dimensional distances could be determined automatically based on a model describing the agricultural vehicle and drip line installation implement 300, which would include the three dimensional physical relationship between the antenna 101A and the tip of the shank 407. This model may also include a three dimensional physical relationship between the tip of the shank 407 and the slotting mechanism 404 and/or between the antenna 101A and the slotting mechanism 404. In another embodiment, the advance time or any of the three dimensional distances, described herein, could be user specified, for example, using a generalized user interface. The manufacturer of the slotting implement 100B and/or of the drip line installation implement 300 may provide a table that the user can use to determine the advance time or the three dimensional distances.

The slotting mechanism position, according to one embodiment, would also be in the GNSS coordinate system since it was determined using the received GNSS position of the antenna and the distances between the antenna and a slotting mechanism or the received GNSS position and the distances between the tip of the shank and a slotting mechanism.

Although, according to one embodiment, the GNSS position determined by the GNSS receiver and the shank tip, and/or the slotting mechanism positions are three dimensional, various embodiments are also well suited for using two dimensional positions instead. For example, x and y coordinates may be used for the GNSS position and respective offsets for the x-axis and y-axis may be used. Alternatively, x and z may be used or y and z may be used instead of x and y. It is noted that since an agricultural vehicle and the attached implements approximately occupy the same horizontal plain, x and z or y and z can approximate three dimensional coordinates and offsets, as discussed herein. The information in a drip line prescription can be compared with slotting mechanism positions to determine placement of slots in the drip line, according to one embodiment, as discussed herein.

The features depicted in FIGS. 1-5A can be arranged differently than as illustrated, and can implement additional or fewer features than what are described herein. Further, the features in FIGS. 1-4 can be combined in various ways. Computers 110A and 110B can be implemented using software, hardware, hardware and software, hardware and firmware, or a combination thereof. Further, unless specified otherwise, various embodiments that are described as being a part of a system depicted in FIGS. 1-4, whether depicted as a part of the system or not, can be implemented using software, hardware, hardware and software, hardware and firmware, or a combination thereof.

Illustrations of a Method for Placing a Drip Line in a Field

Figure 6:
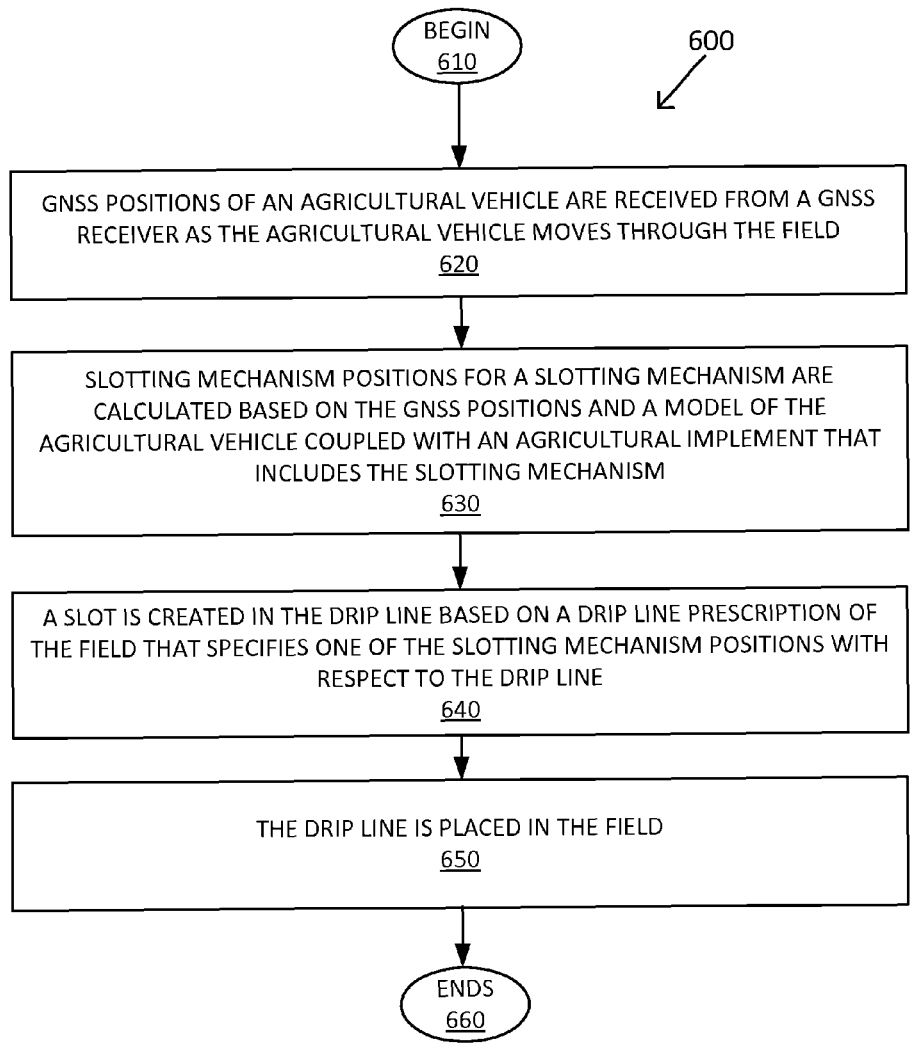
FIG. 6 depicts a flowchart of a method for placing a drip line in a field, according to one embodiment.

FIG. 6 depicts a flowchart 600 of a method for placing a drip line in a field, according to one embodiment.

According to one embodiment, flowchart 600 is of a method implemented as a non-transitory computer readable storage medium having computer readable instructions stored thereon for causing a computer system to perform a method of placing a drip line in a field. Flowchart 600 is only provided by way of example and not by way of limitation. There are other ways of performing the method described by flowchart 600.

At 610, the method begins.

At 620, GNSS positions of an agricultural vehicle 100A are received from a GNSS receiver 102A as the agricultural vehicle 100A moves 401 through the field 400. For example, as the agricultural vehicle 100A moves 401 through the field 400 pulling the installation implement with the attached slotting implement 100B, 200B, GNSS positions can be received by the GNSS receiver 102A indicating positions of the antenna 101A of the agricultural vehicle 100A as it moves through the field 400.

At 630, slotting mechanism positions for a slotting mechanism 104B are determined or calculated based on the GNSS positions and a model of the agricultural vehicle 100A coupled with an agricultural implement 100B, 200B that includes the slotting mechanism 104B.

Various methods can be used for calculating the slotting mechanism position. For example, a time advance of how much time it would take the drip line to travel from the slotting mechanism 404 to the tip of the shank 407 can be used to calculate slotting mechanism positions. In another example, three dimensional distances or offsets from the tip of the shank 407 to the slotting mechanism 404 could be used to calculate the slotting mechanism positions. In yet another example, the slotting mechanism positions can be calculated based on the three dimensional distances between the antenna and the slotting mechanism and the respective x, y, z coordinates of the received GNSS position of the antenna to determine the slotting mechanism position of the slotting mechanism. The advance time or the three dimensional distances could be determined automatically based on a model describing the agricultural vehicle and drip line installation implement 300, which would include the three dimensional spatial relationship between the antenna 101A and the tip of the shank 407. This model may also include a three dimensional spatial relationship between the tip of the shank 407 and the slotting mechanism 404 and/or between the antenna 101A and the slotting mechanism 404. In another embodiment, the advance time or the three dimensional distances could be user specified, for example, using a generalized user interface. The manufacturer of the slotting implement 100B and/or of the drip line installation implement 300 may provide a table that the user can use to determine the advance time or the three dimensional distances.

For example, the first computer 110A can translate the GNSS positions of the antenna 101A received by the GNSS receiver 102A into slotting mechanism positions using either a time advance or one or more models, as described herein.

According to one embodiment, operation 630 is performed by a hardware processor 122A of the first computer 110A depicted in FIG. 1.

At 640, a slot (depicted as dots in FIG. 4) is created in the drip line 406 based on a drip line prescription 128A that specifies one of the slotting mechanism positions with respect to the drip line 406. The first computer 110A can compare each of the slotting mechanism positions with the drip line prescription 128A to determine if a slot should be created when the slotting mechanism 104B is located at that slotting mechanism position. If the drip line prescription 128A indicates that a slot should be created at that slotting mechanism position, the first computer 110A can send an actuation command to the second computer 110B. In response to the actuation command, the second computer 110B can communicate with the slotting actuator 103B by sending it a signal to actuate the slotting mechanism 104B and the slotting mechanism 104B can create a slot in the drip line 406 in response to the signal.

If the drip line prescription 128A includes a number of slots and distance(s) between the slots, the first computer 110A can send actuation commands when appropriate as well. For example, if the drip line prescription 128A specifies 10 slots that are each 18 inches apart starting at position a, then, according to one embodiment, the first computer 110A can send actuation commands when the slotting mechanism positions are at position a, position a plus 18 inches, position a plus 18×2 inches, position a plus 18×3 inches, and so on through position a plus 18×9 inches. In another example, if the drip line prescription 128A specifies 3 slots that are each 18 inches apart starting at position a and 10 slots that are each 10 inches apart starting at position b, the first computer 110A can transmit actuation commands when the slotting mechanism positions are at position a, position a plus 18 inches, position a plus 18×2 inches, position b, position b plus 10 inches, position b plus 10×2 inches and so on through position b plus 90 inches.

In an another embodiment, the first computer 110A may transmit an actuation command to the second computer 110B for controlling the slotting actuator 103B to create a slot immediately upon receipt of the actuation command and further instructions to create slots of one or more specified sizes and at specified distances from the slot that was immediately created. For example, the actuation command may include information such as 3 slots 10 inches apart followed by 5 slots 5 inches apart where the first 4 are 5 gallon per hour slots and the later 6 are 7 gallon per hour slots.

The second computer 110B can receive the actuation commands and instruct the slotting actuator 103B to actuate the slotting mechanism 104B. The slotting mechanism 104B can create a slot in the drip line 406 by lowering the slotting mechanism 104B in response to being actuated. The slotting actuator 103B can raise the slotting mechanism 104B after it has been sufficiently lowered to create a slot or the slotting mechanism 104B may automatically raise itself. The slot may be created in one side of the drip line 406 or may pass through both sides of the drip line 406 so long as the size of the slot would enable the amount of water specified by the drip line prescription 128A for that slot to exit the drip line 406.

Assuming that the slotting actuator 103B is a solenoid and the slotting mechanism 104B is a knife or slotting point, then the solenoid, as depicted in FIG. 5B, can have a piston attached to the slotting mechanism 104B where the piston pushes the slotting mechanism 104B in response to being actuated and then retracts the slotting mechanism 104B. In another example, the slotting mechanism 104B may be a motorized rotary wheel, as depicted in FIG. 5A, that is turned to position the slotting mechanism 104B. The wheel can turn at different speeds in order to provide varied distances between slots. For example, if the wheel is 10 inches in diameter and the prescription specifies 10 inches between slots, then the wheel can turn at a normalized rate. If the wheel is 10 inches in diameter and the prescription specifies 7 inches between slots, the rate that the wheel turns can be increased. If the wheel is 10 inches in diameter and the prescription specifies 15 inches between slots, the rate that the wheel turns can be decreased. The second computer 110B can control the rate at which the wheel turns.

At 650, the drip line 406 is placed in the field 400. For example, assuming there is no opening and the stake 412 is placed on the surface 411 of the ground, tension from one end 414 of the drip line 406 being tied to a stake 412 can cause the slotted portion of the drip line 406 to be placed on the surface 411 of the ground. In another example, the slotted portion of the drip line 406 may go through a shank 407 or through a guide 408 attached to the side or the back of the shank 407 and be placed in an opening 413 of the ground, as depicted in FIG. 4 and discussed herein.

At 660, the method ends.

According to one embodiment, at least the determining or calculating performed in 630 transforms data. For example, the GNSS positions, model and/or prescription can be transformed into slotting mechanism positions. According to one embodiment, the state of the slotting implement 100B is transformed, for example, based on data. For example, the GNSS positions, model and/or prescription is transformed into slotting mechanism positions that transform the state of the slotting implement 100B, for example, from an unactuated state to an actuated state. The GNSS positions, model and/or prescription can also be used to transform the state of the slotting implement 100B from an actuated state to an unactuated state, for example, when a slotting mechanism position is not prescribed by the prescription.

Variable Rate Drip Line Prescriptions

This section provides additional information on variable rate drip line prescriptions, according to various embodiments.

In contrast to conventional techniques, various embodiments determine the type of soil existing in a field to be irrigated by using soil conditions information that includes vertical transects data relating to at least one vertical transect taken within the field. The vertical transect may have multiple layers of different types of soil. Various embodiments consider multi-layered soil conditions when determining the flow rate of water to be supplied to the soil via a drip line.

More particularly, various embodiments of the present technology calculate the desired volume of water that will be accessible to a plant, of the total water content in the soil surrounding the plant's roots. While the total water refers to how much water the soil contains—once gravity removes water from the large cracks or pores (also known as filed capacity), plant available water content refers to how much water of the water that is being held by the soil is actually available to the plant roots. Of note, in some situations, the entirety of the water that is being held by the soil is not available to the plant (known as permanent wilting point). Further, the plant available water can be thought of as the difference between field capacity and a permanent wilting point. The amount of water readily available to a plant or crop (i.e., plant available water content) is typically some fraction of the total water content. In a scenario in which this fraction becomes smaller, it becomes more difficult for the plant to access the remaining water, and thus exemplifies the need for timely and appropriate irrigation. In one embodiment, the volume of water available to the plant (plant available water) is equal to the total water content. Various embodiments also calculate the desired plant available water content at each soil transect based upon a determined vertical soil transect. The vertical soil transect may include several layers of different types of soil, wherein each type of soil or mixture of two soil types have varying consistencies and thicknesses. Therefore, each vertical soil transect has different holding capacities for water and thus, different plant available water contents.

Figure 7:
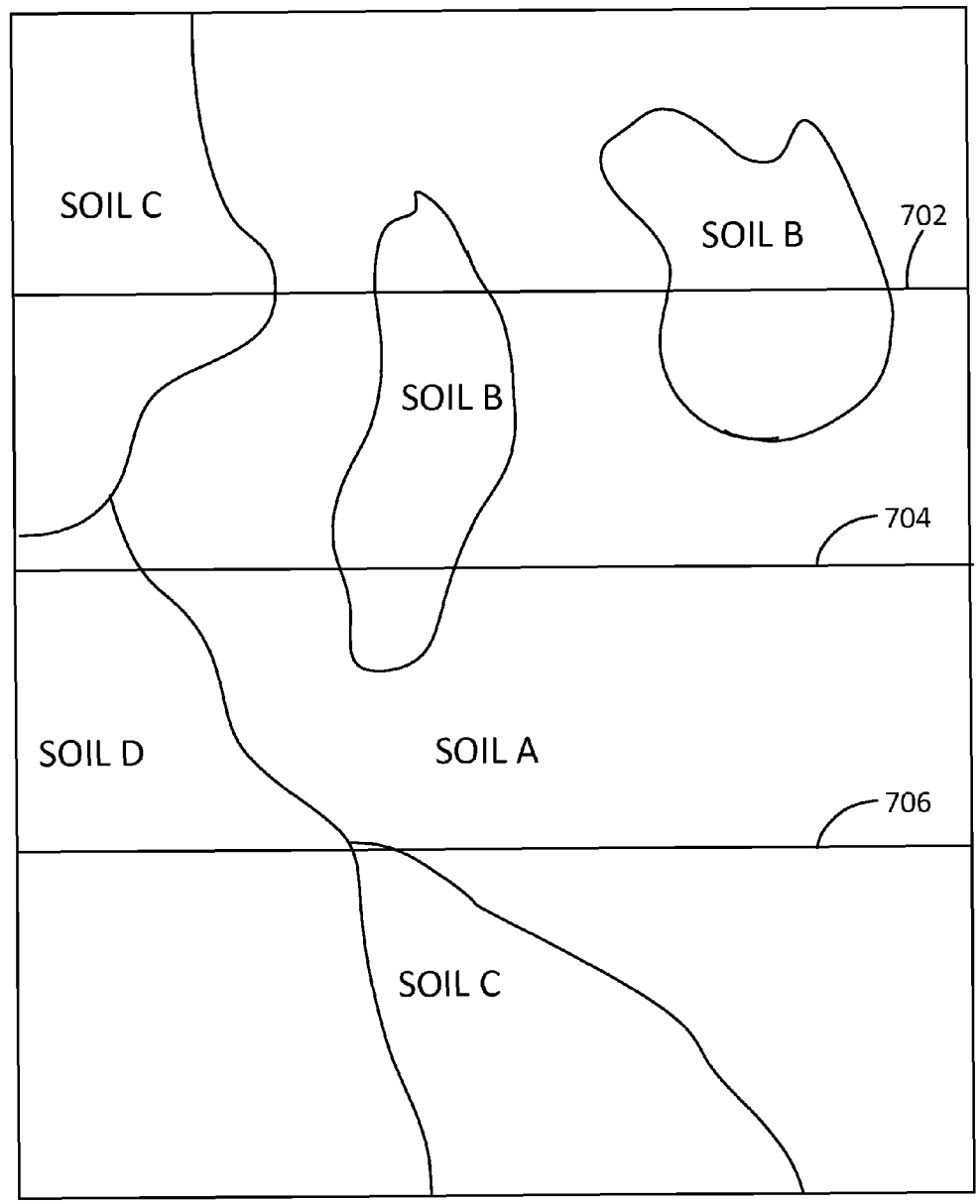
FIG. 7 is an illustration of a customized drip line laid on the ground's surface having thereunder different soil types along the length of each drip line, in accordance with various embodiments.

FIG. 7 is an illustration of a customized drip line laid on the ground's surface having thereunder different soil types along the length of each drip line, in accordance with various embodiments. Each customized drip line is unique to the vertical transect of soil types thereunder.

FIG. 7 shows four soil types, A, B, C, and D. Soil type A is clay. Soil type B is silt. Soil type C is sand. Soil type D is gravel. Also shown are custom drip lines 702, 704 and 706. FIG. 7 shows that soil changes occur in a continuous way along a drip line. For example, the custom drip line 702 moves over varying soil types, from left to right, depicting the following pattern: C, A, B, A, B, A. The custom drip line 704 moves over varying soil types, from left to right, depicting the following pattern: D, A, B, A. The custom drip line 706 moves over varying soil types, from left to right, depicting the following pattern: D, C, A. Since each drip line moves over varying soil types, each drip line may require different types of emitters for the different soil types. Additionally, the analysis of a lateral movement over varying soil types may also reveal vertical transects of soil having multiple layers of different types of soil.

In finding the vertical transect of soil types for different locations, the content of the soil's vertical transect information in a given plant area is surveyed through advanced soil mapping technology. For example, the following process is performed, using the Soil Information System™ (SIS) provided by C3, a division of Trimble, headquartered in Sunnyvale, Calif. The SIS provides a three dimensional database of field soil, obtaining over sixty physical and chemical characteristics. Actionable diagnostic reports are then generated from such a study.

Of note, since soil has been formed through millenniums through the interaction of topography, as well as through the weathering of rocks, minerals and organic matter, the resulting soil is hugely variable. The SIS provides accurate soil information to enable more precise farming. There are five steps to the SIS mapping process: 1) Define Field Boundary; 2) High resolution topographic and EM mapping (Surfing); 3) Soil characterization (Diving); 4) Soil chemical property characterization; and 5) Processing of input data through intelligent algorithms and database reference.

At step one, the boundary of the field is defined using a "surfer". A surfer is an ATV equipped with high resolution GPS, an electromagnetic (EM) sensor, and an on board computer that runs the SIS proprietary software. This software ties all parts of the mapping process together, from the targeting of optimal data collection locations to assisting field operators with in-field navigation, to transferring field collected data to an SIS office for data processing.

At step two, the surfer is used to fill in the detail within the perimeter defined in step one. The system is collecting variability information using the EM (which is the sled pulled behind the Surfer) and its corresponding position. Then surfer data is collected at a rate of approximately forty acres per hour. While this is occurring, the software is integrating the elevation to create what is called a digital elevation model. Information is being collected approximately every meter. Concurrently, the software at the SIS office is processing this information in preparation for the next step. The field's topography is displayed through a digital elevation model (DEM) and is useful in managing solar radiation availability and erosion potential. The SIS also collects electromagnetic conductivity data to provide the SIS with a better understanding of bulk soil variability and patterns. This information is used for step three.

At step three, that which creates the soil variability found in step two is investigated. This investigation process is called soil characterization, or diving. The diver (performing the diving) can be mounted on a number of different platforms. In one example, it is mounted on a tractor. It can also be mounted on a six wheeled gator or a track vehicle. The diver also has a survey grade GPS. It has a probe with different soil sensors that are pushed into the ground with a push system, as well as an on-board computer. The information from the surfer is sent to the diver. The software collects the locations on the field, which locations are targeted based upon the variability found in the step one. Continuing on, in step three, the diver software guides the operator to a particular point, for anchoring the system into the ground. This step will ensure that all measurements are repeatable. The geophysical probe is pushed into the ground (the push system is augured into the ground to provide stability and repeatability of measurements) to collect continuous data streams for tip force, sleeve friction, moisture, and electrical resistance. (A 100 acre field typically has thirty to one hundred probe sites, and each probe takes about one minute to perform.) The probe data that is streamed to the on-board computer captures continuous soil variability. Monitoring data signatures (using the on-board computer) while the data is being collected ensures data quality. The entire process of collecting data at each location takes approximately five minutes. All previously collected data is used as input for step four.

At step four, the chemical properties of the soil are characterized. The software processes all of the data collected from the surfer and the diver and selects locations, "X", "Y" and "Z" from the field in which cores will be taken to maximize the three dimensional presentation. (The on-board computer determines the optimal locations for chemical property core collection. The software helps to determine the ideal depths of subsampling to maximize a three dimensional spatial representation for chemical property analysis.) (All collected data is electronically sent from the field to an SIS processing center.)

At step five, all of the information is processed using algorithms and databases to interpret the data and create three dimensional maps. These three dimensional maps provide accurate soil information. For example, in a 120-acre field, the plant available water may vary by 100% horizontally and by 50% vertically. Over the root zone depth, the plant available water varies by 70%. The soil of a typical field has massive variation. The knowledge of plant available water influences irrigation layout, scheduling, moisture sensor targeting, rootstock selection and many other management decisions.

At a more general level, the process of sampling the soil for soil variability, and hence plant available water, in order to create high resolution three dimensional maps of a soil's type and thickness of soil layers is described as follows. Penetrometers are used to measure how much moisture is in the soil at the time of sampling. The use of the penetrometer not only determines the soil type and thickness of different soil layers, but it also determines the soil's chemical properties (and thus adsorption-how much positive charge a soil can hold). For example, the soil's chemical properties may include data indicating the extent of a soil's negative charge, if any. A soil's level of negative charge and the strength thereof affects the soils ability to hold fertilizer, thus affecting the plant's health and growth. For example, clay has more negatively charged particles than sand (which is slightly negatively charged). The higher the number of negative charges in a given volume of soil, the more fertilizer it can hold, since fertilizer is positively charged. Fertilizer typically includes positively charged elements, such as nitrogen, phosphorous and/or potassium. Thus, a foot of clay is more negatively charged than a foot of sand, and will hold more fertilizer than the sand will hold.

A penetrometer is inserted into the test subject (soil) or pressed against it and the depth of the resulting hole is measured. Enough core samplings are performed to overcome a statistical threshold required to determine (based on smart-sampling software which is part of the SIS) that a second location will likely have the same soil type and soil layer(s) found by a penetrometer performed at a first location, wherein the first location neighbors the second location.

Fertigation is the application of fertilizers, soil amendments or other water-soluble products through an irrigation process. Typically, during fertigation via a drip irrigation system, fertilizer is mixed with water and delivered to the plants. Additionally, sometimes fertigation is used to detach unwanted positively charged elements from the soil, like calcium, that have attached themselves to the negatively charged soil (e.g., clay). Of note, various embodiments may also be used with chemigation. Chemigation is the application of chemicals through an irrigation process.

FIG. 8 illustrates a drip line laid over the ground's surface, demonstrating root profiles of the plant and a growth state of the plant, in accordance with an embodiment. As the growth stage of a plant and weather change, so too should the drip line prescription be varied. The drip line 808 shows emitters "b", "d" and "e" connected thereto. The plant 804 has a root profile that has grown to "x" inches in length through the following soil layers from top to bottom: B (silt); A (clay); and B (silt). The plant 806 has a root profile that has grown to "y" inches in length through the following soil layers from top to bottom: B (silt); C (sand); and B (silt). The time at which the plant root of plant 804 penetrates various depths of the soil is measured at lines 810, 812, 814 and 816. The time at which the plant root of the plant 806 penetrates various depths of the soil is measured at lines 818, 820, 822 and 824.

With regard to the plant 804, the area between the ground surface 802 and the line 810 represents the time between 0 and 4 weeks. The area between the line 810 and the line 812 represents the time between 4 and 7 weeks. The area between the line 812 and the line 814 represents the time between 7 and 12 weeks. The area between the line 814 and the line 816 represents the time between 12 and 16 weeks.

With regard to plant 806, the area between the ground surface 802 and the line 818 represents the time between 0 and 4 weeks. The area between the line 818 and the line 820 represents the time between 4 and 7 weeks. The area between the line 820 and the line 822 represents the time between 7 and 12 weeks. The area between the line 822 and the line 824 represents the time between 12 and 16 weeks.

Even though FIG. 8 shows an analysis of the growth of the plant's roots over a span of designated time periods (between 4, 7, 12 and 14 weeks), it should be appreciated that any amount of time may be measured with respect to the length of the plant root. In this example, the root of the plant 804 has reached a growth length of 12 inches having a depth "x". It took the plant 804 four weeks to grow three inches to reach point 826. It took the plant 804 three more weeks to grow an additional three inches to reach the point 828. It took the plant 804 five more weeks to grow an additional three inches to reach the point 830. It took the plant 804 two more weeks to grow an additional three inches to reach the point 832.

In contrast to plant 804, the plant 806 grew at a different rate than the plant 804. In this example, the root of the plant 806 has reached a growth length of 9½ inches. At four weeks after being planted, the root of the plant 806 measured three inches at point 834. At seven weeks, the root of the plant 806 measured four and one half inches at point 836. At 12 weeks, the root of the plant 806 measured seven inches at point 838. At 16 weeks, the root of the plant 806 measured nine and one half inches having a depth "y" at point 840. FIG. 8 demonstrates an example in which the plants 804 and 806 are different, grow at different rates, and grow through different combinations of soil types.

With regard to plant 804, an embodiment enables the conservation of water. For example, at the four week mark, line 810, the root of the plant 804 has only reached three inches; it is unnecessary to provide water to the area under the planting location of plant 804 such that the water reaches a depth of nine inches below the soil. However, if the line 810 is near the permanent wilting point for the plant, and if there is never enough water applied to increase the water content of the soil below the line 810, no roots will be able to grow at this location. So, it is necessary, in some instances, to anticipate plant growth in order to provide water at a location below that which the plant root occupies, and to attempt to manage plant growth by applying enough water to encourage root growth beyond, for example, line 810 (at the four week mark).

Thus, knowing the plant growth rate and the soil through which it must grow enables various embodiments to determine how much water to deliver, via the soil, to the plant throughout its life cycle.

The following non-limiting examples are factors that various embodiments consider when determining how much water to deliver to a plant: root profile (root growth and root uptake); plant type (including the plant's canopy structure); exposure to the elements; climate; time of year; time of day; daily weather conditions; chemical content of soil (positively/negatively charged); content of the soil (types of soil); distribution of the type of soil (layers of different soil types); content of fertilizer desired to be applied; content of chemicals desired to be applied; desired plant growth; and the plant available water determination.

Of note, the canopy structure of the plant is the organization or spatial arrangement (3-D geometry) of the plant's canopy. In the context of various embodiments, the plant's canopy is the extent of the outer layer of leaves of a plant. The leaf area index ("LAI") is the leaf area per unit of ground area covered by the plant's canopy.

Various embodiments provide a drip line prescription that outlines a location and type of a set of emitters to be placed on the drip line such that the drip line is enabled to supply an amount of water at a particular flow rate over a particular period of time to the soil that meets the desired volume of water accessible (in the soil) to a plant that is needed by the plant for a desired growth. Thus, in various embodiments, the drip line supplies a specific volume, "V", of water to the soil during a specific amount of time. To accomplish this, the set of emitters have a certain flow rate that enables the specific volume, "V", of water to enter the soil. The soil holds this water to a certain extent and also allows excess water to percolate through the soil at a certain quantity/hour. Various embodiments calculate how much water is to be supplied to the vertical transect of soil, and subtracts how much water is anticipated to move through the vertical transect of the soil over a certain span of time and subtracts how much water that the vertical transect of soil is holding and not making available to the plant's roots. The difference is the quantity of plant available water content. When there are multiple layers of different soil types in a single vertical transect of the soil, then the rates at which the water moves through each soil type is weighed against each other to arrive at the average flow rate for the vertical transect and to determine how much anticipated water is to remain in the vertical transect. Further, the plant has a growth stage in which its root only reaches a certain depth of the vertical transect of soil. (Of note, while examples described herein concentrate on annual crops, it should be appreciated that various embodiments also apply to perennial crops, despite its different root system.) Therefore, according to various embodiments, the anticipated growth rate is a factor in determining which portion (e.g., layer) of the vertical transect of soil needs to have more or less water available to the plant's roots (plant available water content). In some instances, it is desirable for the plant's roots to always have accessible (or available) water. While in other instances, some plants desire a dry period between wet periods. Thus, various embodiments determine the amount of water that it is desired for a plant root to have at a given point in time. Various embodiments further determine the timing of the water delivery via the drip line. Then, various embodiments determine the flow rate needed for delivery of water to the field, thereby also determining the type of emitter having a particular flow rating that is needed for water delivery.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a computer system and are executed by the hardware processor, such as one or more hardware processors, of the computer system 110A, 110B. When executed, the instructions cause a computer system to implement the functionality of various embodiments of the present invention. For example, the instructions can be executed by a central processing unit associated with the computer system. According to one embodiment, the non-transitory computer readable storage medium is tangible. The non-transitory computer readable storage medium may be hardware memory. The central processing unit that executes the instructions may be hardware processor.

Unless otherwise specified, one or more of the various embodiments described in the context of FIGS. 1 and 2 can be implemented as hardware, such as circuitry, firmware, or computer readable instructions that are stored on non-transitory computer readable storage medium. The computer readable instructions of the various embodiments described in the context of FIGS. 1-2 can be executed by one or more hardware processors, which may be a central processing unit, to cause a computer system to implement the functionality of various embodiments. For example, according to one embodiment, the features 110A, 110B and the operations of the flowcharts depicted in FIG. 6 are implemented with computer readable instructions that are stored on computer readable storage medium that can be tangible or non-transitory or a combination thereof.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

According to one embodiment, an agricultural implement is provided comprising: a slotting mechanism 104B for cutting slots in a drip line in real time in conjunction with ground placement of the drip line; and a slotting actuator 103B for actuating the slotting mechanism, wherein the actuating is controlled by a computer 110B following a slot spacing in a drip line prescription for a field in which a drip line is being placed.

According to one embodiment, the agricultural implement includes the computer 110B.

According to one embodiment, the slotting actuator 103B performs the actuating of the slotting mechanism 104B in response to the computer 110B receiving actuation commands.

According to one embodiment, the slotting actuator 103B is an electrically controlled slotting mechanism and wherein the agricultural implement further comprises: a shank 407 for creating an opening 413 in the ground of the field 400 for burying the drip line 406 after the slots are cut by the electrically controlled slotting mechanism.

According to one embodiment, the agricultural implement further comprising: a spindle 301 for holding a spool 302 of the drip line.

According to one embodiment, the agricultural implement further comprising: a guide 405 configured for guiding the drip line 406 from a spool 402 of the drip line with respect to the slotting mechanism 404.

According to one embodiment, the agricultural implement further comprising: a hitching mechanism 303A for coupling the implement to a machine which is capable of pulling the implement through the field. For example, the hitch 303B can be connected with the hitching mechanism 303A.

According to one embodiment, the drip line 406 is selected from a group consisting of a drip tape and a drip tube.

According to one embodiment, the slotting mechanism 103B, 203B, 403 is selected from a group consisting of a solenoid and a motorized wheel.

According to one embodiment, the agricultural implement includes a plurality of slotting mechanisms of different sizes for creating slots of different sizes in the drip line.

According to one embodiment, the agricultural implement includes a plurality of slotting mechanisms for creating slots in a plurality of drip lines, wherein each of the slotting mechanisms are controlled by the computer 110B.

Various embodiments provide a drip line placement system comprising: a computer 110A for interpreting a drip line prescription 128A for a field in which a drip line 406 is being placed; a GNSS receiver 102A coupled with the computer 110A and configured for determining a position of the drip line placement system; and an agricultural implement 100B, 200B communicatively coupled with the computer 110A, the agricultural implement comprising: a slotting mechanism 404 for cutting slots in a drip line 406 in real time in conjunction with ground placement of the drip line 406; and a slotting actuator 403 for actuating the slotting mechanism 404, wherein actuation of the slotting actuator 403 is controlled by the computer 110A, 110B following a slot spacing prescribed for the position in the prescription 128A.

According to one embodiment, the slotting mechanism 404 is an electrically controlled slotting mechanism and wherein the drip line placement system further comprises: a shank 407 for creating an opening 413 in the ground of the field 400 for burying the drip line 406 after the slots are cut by the electrically controlled slotting mechanism.

According to one embodiment, the drip line placement system, further comprising one or more spindles 301 for holding one or more spools 302 of drip line.

According to one embodiment, the drip line placement system further comprises a tool bar 316, 416 for adjusting placement of two or more spindles 301 for each holding respective spools 302 of drip line.

According to an embodiment, a method for placing a drip line in a field is provided, the method comprising: receiving 620 GNSS positions of an agricultural vehicle from a GNSS receiver as the agricultural vehicle moves through the field; calculating 630, performed by a hardware processor of a computer, slotting mechanism positions based on the GNSS positions and a model of the agricultural vehicle coupled with an agricultural implement; creating 640 a slot in the drip line based on a drip line prescription of the field that specifies one of the slotting mechanism positions with respect to the drip line; and placing 650 the drip line in the field.

According to various embodiments, the method further comprises: performing the receiving 620, the calculating 630, and the creating 640 repeatedly until all slots specified by the drip line prescription have been created.

According to an embodiment, the method further comprises: varying at least one characteristic of the slots being created based on a variable rate drip line prescription, wherein the at least one characteristic is selected from a group consisting of slot size and distance between adjacent slots of the drip line.

According to an embodiment, the agricultural implement includes a slotting mechanism 104B and a slotting actuator 103B that controls the slotting mechanism 104B and wherein the method further comprises: interpreting, performed by the hardware processor 112A, the drip line prescription for the field; and transmitting a command from the computer 110A to a slotting actuator 103B, for example via computer 110B, in response to the drip line prescription specifying the one of the slotting mechanism positions.

According to an embodiment, the method further comprises: receiving at the slotting actuator the command; and creating the slot by actuating the slotting mechanism with the slotting actuator based on the command. For example, the slotting actuator 103B can receive a command and can create a slot by actuating slotting mechanism 104B based on the command.

According to an embodiment, the method further comprises: unspooling the drip line 405 from a spool 402; guiding the drip line 405 from the spool 402 with respect to the slotting mechanism 404, for example, using a guide 405; and creating slots in the drip line 405 by actuating the slotting mechanism 404 based on the drip line prescription as the drip line 405 is being unspooled.

According to an embodiment, the method further comprises: creating an opening 413 in the ground of the field 400; and placing the drip line 406 in the opening 413 after the slot is created in the drip line 406.

What is claimed is:
1. A drip line placement system comprising:
a computer for interpreting a drip line prescription for a field in which a drip line is being placed, wherein the drip line prescription relates to slot spacing for the drip line and position in the field;
a global navigation satellite system (GNSS) receiver coupled with the computer and configured for determining a position of the drip line placement system; and
an agricultural implement communicatively coupled with the computer, the agricultural implement comprising:
two or more spindles for each holding respective spools of drip line;
a tool bar supporting the two or more spindles, wherein the tool bar facilitates adjusting placement of the two or more spindles for each holding respective spools of drip line;
a slotting mechanism for cutting slots in the drip line in real time in conjunction with ground placement of the drip line as determined based on the position of the drip line placement system determined using the GNSS receiver; and
a slotting actuator for actuating the slotting mechanism, wherein actuation of the slotting actuator is controlled by the computer following a slot spacing prescribed for the position of the drip line placement system in the drip line prescription.

2. A drip line placement system of claim 1, wherein the slotting mechanism is an electrically controlled slotting mechanism and wherein the drip line placement system further comprises:
a shank for creating an opening in a ground of the field for burying the drip line after the slots are cut by the slotting mechanism.

3. A drip line placement system of claim 1, wherein the slotting actuator is attached to the tool bar.

4. A drip line placement system of claim 1, wherein the tool bar facilitates spacing the two or more spindles further apart or closer together.

5. A method for placing a drip line in a field, the method comprising:
determining global navigation satellite system (GNSS) positions of an agricultural vehicle based on data received from a GNSS receiver associated with the agricultural vehicle as the agricultural vehicle moves through the field;
calculating, performed by a hardware processor of a computer, a drip line prescription for the field, wherein the drip line prescription relates to slot spacing for the drip line and position in the field;
interpreting the drip line prescription to identify slotting mechanism positions based on the GNSS positions and a model of the agricultural vehicle coupled with an agricultural implement, wherein the agricultural implement comprises:
two or more spindles for each holding respective spools of drip line;
a tool bar supporting the two or more spindles, wherein the tool bar facilitates adjusting placement of the two or more spindles for each holding respective spools of drip line;
a slotting mechanism for cutting slots in the drip line in real time in conjunction with ground placement of the drip line as determined based on the GNSS positions; and
a slotting actuator for actuating the slotting mechanism, wherein actuation of the slotting actuator follows a slot spacing prescribed for the GNSS positions in the drip line prescription;
creating slots in the drip line in real time according to the drip line prescription based on positions of the agricultural vehicle as determined using the GNSS receiver; and
placing the drip line in the field.

6. The method as recited by claim 5, wherein the method further comprises:
performing the interpreting and the creating repeatedly until all slots specified by the drip line prescription have been created.

7. The method as recited by claim 5, wherein the method further comprises:
varying at least one characteristic of the slots being created based on a variable rate drip line prescription, wherein the at least one characteristic is selected from a group consisting of slot size and distance between adjacent slots of the drip line.

8. The method as recited by claim 5, wherein the agricultural implement includes a slotting mechanism for creating slots in the drip line and a slotting actuator that controls the slotting mechanism and wherein the method further comprises:
transmitting a command from the computer to the slotting actuator in response to the drip line prescription specifying the slotting mechanism positions.

9. The method as recited by claim 8, wherein the slotting actuator actuates the slotting mechanism to create a slot in the drip line upon the slotting actuator receiving the command.

10. The method as recited by claim 8, wherein the method further comprises:
unspooling the drip line from a spool;
guiding the drip line from the spool with respect to the slotting mechanism; and
creating the slots in the drip line in real time by actuating the slotting mechanism based on the drip line prescription as the drip line is being unspooled.

11. The method as recited by claim 5, wherein placing the drip line in the field includes:
creating an opening in a ground of the field; and
placing the drip line in the opening.

* * * * *